United States Patent Office 3,185,708
Patented May 25, 1965

---

3,185,708
FUSED TRICYCLIC LACTONES AND THEIR PREPARATION
Samuel S. Mims, Winston-Salem, N.C., assignor to R. J. Reynolds Tobacco Company, Winston-Salem, N.C., a corporation of New Jersey
No Drawing. Filed Mar. 7, 1962, Ser. No. 177,987
3 Claims. (Cl. 260—343.2)

This invention relates to new chemical compounds, their preparation and use as flavor-imparting agents in tobacco.

It is well known in the tobacco art that the domestic tobaccos which are exemplified by burley, Maryland, flue-cured, bright leaf or Virginia tobaccos are low in flavor as compared with so-called oriental or aromatic tobaccos which are imported from Turkey, Greece, Bulgaria, Yugoslavia, Rhodesia and Russia. Accordingly, it has been common practice in the tobacco industry to prepare blends of domestic and oriental tobaccos in order to provide cigarettes which have desired flavor and aroma characteristics.

It is therefore an object of the present invention to provide new chemical compounds which can be incorporated into domestic tobaccos to improve their flavor and aroma.

An additional object of this invention is to provide a domestic tobacco which has an enhanced flavor and aroma.

A further object of the invention is the provision of a domestic type tobacco having added thereto a chemical compound which imparts a distinctive odor which is pleasing to the smoker.

The new chemical compounds of this invention are 1,2,5,5a,6,7,8,9,9a,9b-decahydro-6,6,9a-trimethyl-naphtho(2,1-b)furan-2-one (Compound I) and 2,3,6,6a,7,8,9,10,10a,10b-decahydro-7,7,10a-trimethyl-1H-naphtho(2,1-b)pyran-3-one (Compound II). The chemical structure of these new compounds may be represented by the following formulae:

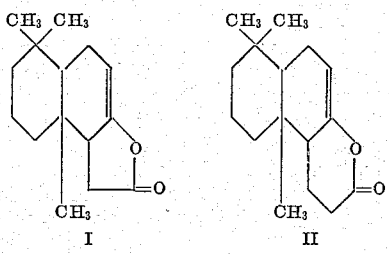

I       II

The chemical relationship of Compounds I and II is apparent from a consideration of the structural formulae given above. These new compounds have been prepared from sclareol which is a terpene-like compound contained in the flowering tops of *Salvia sclarea* as follows: Approximately 100 grams of sclareol was refluxed in 200 milliliters of toluene over a mixture of 50 grams of magnesium sulfate and 50 grams of sodium sulfate. The product contained unchanged sclareol (approximately 30 grams) and a mixture of isomers called "sclarenes" (approximately 60 grams). These "sclarene" isomers may be represented generally as follows:

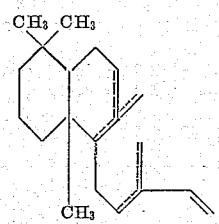

Approximately 1.3 grams of a mixture of the above "sclarene" isomers were ozonized in 75 milliliters of ethyl acetate by bubbling ozone through the solution until a blue color developed therein. The ethyl acetate solvent was then removed. One hundred milliliters of 3 percent hydrogen peroxide solution was added to the ozonide and the mixture refluxed four hours. Cyclization of the crude product resulting from this oxidation was effected by refluxing for four hours the crude product in 15 milliliters of acetic anhydride containing freshly fused sodium acetate (1 gram). The acetic anhydride solvent was then removed and resulting product chromatographed on silicic acid. Compound I was eluted from the chromatographic column with hexane-benzene mixtures. The yield of Compound I was approximately 10 percent and it was found to have a melting point of 84–85° C. Its structure as illustrated above was confirmed by nuclear magnetic resonance and infrared spectrometry procedures. Its molecular weight was found to be 234 which agrees exactly with the calculated molecular weight.

*Analysis.*—Calculated for $C_{15}H_{22}O_2$: C, 76.88; H, 9.46. Found: C, 77.00; H, 9.49.

Compound II was eluted from the chromatographic column with benzene in approximately a 20 percent yield. Its melting point was 80.5–81.5° C. Its molecular weight was found to be 248, which agrees exactly with the calculated molecular weight. The infrared spectrum of Compound II showed absorption in the double bond region at 5.65 microns and 5.90 microns.

*Analysis.*—Calculated for $C_{16}H_{24}O_2$: C, 77.37; H, 9.74; O, 12.89. Found: C, 77.28, 77.37; H, 9.80, 9.73; O, 13.21, 13.25.

In a variation of the procedure described above, oxidation of the "sclarene" isomers has been achieved using potassium permanganate in acetic acid and cyclization has been achieved by subjecting the oxidation product to pyrolysis at 350° C.

Compound I has also been prepared from an acetoxy acid, 2-acetoxy-2,5,5,8a-tetramethyldecahydronaphthalene acetic acid having the structure:

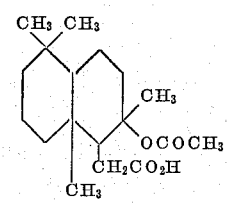

The acetoxy acid is obtained by the oxidation of manoyl oxide with oxidizing agents such as potassium permanganate as follows:

A mixture of 25 grams of manoyl oxide (.086 mole), 500 milliliters of acetic acid, and 5 grams of sodium acetate is slurried and warmed to a temperature of about 50° C. To this mixture 75 grams (0.47 mole) of potassium permanganate is added in small portions over a period of about 3 hours. The reaction mixture is agitated vigorously during the addition. Agitation is continued for an additional 2 to 4 hours at the same temperature to complete the reaction.

To this mixture 75 grams of potassium bisulfite is slowly added while maintaining the mixture at a temperature of between 20 and 25° C. to generate sufficient sulfur dioxide so as to convert the precipitated manganese dioxide to the water soluble manganese sulfate. Prior to the addition of the potassium bisulfite, 200 milliliters of 2 N sulfuric acid is added to facilitate the generation of sulfur dioxide. The mixture is then diluted in 3000 milliliters of water and the precipitated product filtered.

The solid product at this stage comprises a substantial amount of the above acetoxy acid which can be isolated from the oxidation products by partitioning the oxidation product between an organic solvent and a solution of aqueous sodium carbonate. Acidification of the aqueous layer then yields the acetoxy acid.

The acetoxy acid may also be prepared from sclareol using a procedure similar to that indicated immediately above.

Having obtained the acetoxy acid, Compound I was prepared as follows:

The acetoxy acid (10.0 g.) was dissolved in an aqueous sodium carbonate solution (75 ml. water, 4.0 g. sodium carbonate) and the resulting solution was refluxed for two hours to convert by dehydroacetoxylation the acetoxy acid to the unsaturated acid, 2-methylene-5,5,8a-trimethyl-decahydronaphthalene acetic acid. The solution was cooled and diluted with water (500 ml.) Potassium permanganate (15.5 g.) was slowly added while the reaction mixture was stirred and the reaction temperature kept below 10° C. After addition of the permanganate, which required four hours, the reaction mixture was allowed to warm to 24° C. The reaction mixture was acidified with 50% sulfuric acid and the manganese dioxide formed during the reaction was converted to soluble substances by the addition of sodium bisulfite. The oxidation product was then isolated by extraction with ether (three 200-ml. portions).

The acidic portion of the oxidation product was isolated by extraction of this ether solution with three 200-ml. portions of a 10% sodium carbonate solution. Acidification of the carbonate solution with 50% sulfuric acid resulted in isolation, again by ether extraction, of a crude material (6.1 g.) believed to be a keto acid.

This crude material was dissolved in acetic anhydride (50 ml.) and fused sodium acetate (1 g.) was added. This mixture was refluxed for four hours, then volatile components were pulled off under vacuum leaving a yellow oil (6.1 g.).

This oil was chromatographed on silicic acid. Compound I (1.5 g., 20.5% yield based on starting acetoxy acid) was eluted with hexane-benzene mixtures [M.P. 84.0–85.5°; M.W. calcd. 234, found 234 (mass spec.); infrared and nuclear magnetic resonance spectra consistent with assigned structure; calcd. for $C_{15}H_{22}O_2$—C, 76.88; H, 9.46; found—C, 77.00; H, 9.49].

Compound II has also been prepared from ambreinolide, a compound which can be synthetically prepared by the procedure described by Schenk, H. R., Gutmann, H., Jeger, O., and Ruzicka, L. in Helv. Chim. Acta, 35, 817–824 (1952). The preparation of Compound II from ambreinolide was carried out as follows: Approximately 2.3 grams of prepared ambreinolide was vaporized at 100° C. into a stream of nitrogen which carried the vapors through a pyrolysis tube maintained at a temperature of approximately 450° C. It is important that the pyrolysis be carried out in an inert atmosphere with air being excluded. Attempts to prepare the new compounds by pyrolysis of ambreinolide in air resulted in failures. A light yellow solid (1.8 grams) was collected at the exit of the pyrolysis tube. This solid melted at 92–96° C. but after crystallization from hexane had a melting point of 106–108° C. Approximately 1.2 grams of the solid resulting from pyrolysis was ozonized in 80 milliliters of ethyl acetate by passing ozone through the solution until a blue color developed. The ozonide was then destroyed by oxidative hydrolysis by refluxing it in 100 milliliters of a 3 percent solution of hydrogen peroxide for four hours. The resulting light yellow oil was subjected to cyclization without further purification by refluxing it for four hours in 10 milliliters of acetic anhydride containing freshly fused sodium acetate (0.05 gram). Chromatography on silicic acid followed by two crystallization from n-pentane yielded, in about 50 percent yield, a material shown by its melting point and its infrared absorption spectrum to be Compound II.

In accordance with this invention, Compound I or Compound II is added to domestic tobacco in amounts to provide a tobacco in which is dispersed about 0.005 to 0.2 percent by weight of the additive. Preferably, the amount of additive is between about 0.01 and about 0.1 percent by weight in order to form a domestic tobacco having a desired flavor and aroma. The additive may be applied in any suitable manner and preferably in the form of a liquid solution or suspension by spraying, dipping or otherwise. The additive may be incorporated at any step in the treatment of the tobacco. Only a portion of the domestic tobacco need be treated and the thus treated tobacco may be blended with other tobaccos before the cigarettes are formed. In such case the tobacco added may have the additive in excess of the amounts indicated so that when blended with other tobaccos the final product will have a percentage within the indicated range.

In accordance with one specific example of this invention, Compound II in a solution of ethyl alcohol was injected into flue-cured cigarettes in an amount to provide about 0.7 milligram of the additive per cigarette. The ethyl alcohol was evaporated from the cigarettes by passing a current of air over the cigarettes for 18 hours. The cigarettes were allowed to equilibrate for 48 hours in desiccators over solutions of 3 parts glycerol to 1 part water. This conditioning provides about a 12 percent moisture content in the tobacco. It has been found that the cigarettes when treated as indicated have a desired and placing odor which is detectable to some extent when the cigarette is in its package and which is particularly detectable in the main and side smoke stream when the cigarette is smoked. A similar product may be prepared by employing Compound I in the manner indicated and a tobacco product having similar desired properties results therefrom.

It will be particularly apparent that the manner in which the additive is applied to the tobacco is not particularly important since, as indicated, it may be done in the form of spraying or dipping, utilizing suitable suspensions or solutions of the additive. Thus water or volatile organic solvents, such as alcohol, ether, acetone, volatile hydrocarbons and the like, may be used as the carrying medium for the additive while it is being applied to the tobacco. Also other flavor and aroma producing additives, such as those disclosed in Jones United States Patent No. 2,766,145, may be incorporated into the tobacco with the additives of this invention. In addition it will be apparent that mixtures of any or all of the herein described Compounds I and II may be used in the tobacco if desired, the total concentration preferably being within the stated range of 0.01 and 0.3 percent (most preferably between 0.02 and 0.15 percent) based on the weight of the tobacco in the product to be smoked. It will also be apparent that in certain cases the desired flavoring effect can be achieved by incorporation of the subject compounds into the non-tobacco portions of the tobacco product such as the cigarette paper, adhesives, filter plug and so forth. While the compounds of this invention are particularly useful for the improvement of domestic tobaccos of the burley or flue-cured type, they are also suitable for use in connection with certain of the oriental or aromatic tobaccos. They may also be used to improve synthetic tobacco products or tobacco products formed from sheeted tobacco dust or fines which are well known to the art.

Those modifications and equivalents which fall within the spirit of the invention and the scope of the appended claims are to be considered part of the invention.

I claim:

1. The compound 1,2,5,5a,6,7,8,9,9a,9b-decahydro-6,6,9a-trimethyl-naphtho(2,1-b)furan-2-one.

2. A method of preparing 2,3,6,6a,7,8,9,10,10a,10b- decahydro - 7,7,10a-trimethyl-1H-naphtho(2,1-b)pyran-3-one and 1,2,5,5a,6,7,8,9,9a,9b-decahydro-6,6,9a-trimethyl-naphtho(2,1-b)furan-2-one which comprises heating in the presence of magnesium sulfate and sodium sulfate a hydrocarbon solution of sclareol to obtain a mixture of sclarene isomers, contacting said mixture of sclarene isomers in ethyl acetate solution with ozone to form an ozonide, removing ethyl acetate from the ozonide, refluxing said ozonide in the presence of hydrogen peroxide to form an oxidation product, and then refluxing the said oxidation product in the presence of an acetic anhydride solvent containing sodium acetate for a time sufficient to form the compounds 2,3,6,6a,7,8,9,10,10a,10b-decahydro-7,7,10a-trimethyl-1H-naphtho(2,1-b)pyran-3-one, and 1,2,5,5a,6,7,8,9,9a,9b - decahydro - 6,6,9a - trimethyl-naphtho(2,1-b)furan-2-one and then separating said compounds from the reaction mixture.

3. The method of preparing 2,3,6,6a,7,8,9,10,10a,10b-decahydro - 7,7,10a - trimethyl-1H-naphtho(2,1-b)pyran-3-one which comprises subjecting ambreinolide to pyrolysis at a temperature of about 450° C. in the presence of nitrogen, contacting the pyrolyzed product in ethyl acetate solution with ozone to form an ozonide, and then refluxing said ozonide in the presence of hydrogen peroxide to form an oxidation product, and then refluxing said oxidation product in the presence of an acetic anhydride solvent containing sodium acetate for a time sufficient to form the compound 2,3,6,6a,7,8,9,10,10a,10b - decahydro-7,7,10a - trimethyl-1H-naphtho(2,1-b)pyran-3-one, and then separating said compound from the reaction mixture.

References Cited by the Examiner
UNITED STATES PATENTS

| | | | |
|---|---|---|---|
| 2,862,953 | 12/58 | Abe et al. | 260—464 |
| 2,869,557 | 1/59 | Teague | 131—144 |
| 2,933,506 | 4/60 | Ohloff et al. | 260—343.2 |
| 3,019,233 | 1/62 | Chinn | 260—343.3 |

OTHER REFERENCES

Woodward et al.: Jour. Amer. Chem. Soc., vol. 74 (1952), p. 4230.

Bigley et al.: J. Chem. Soc., (November 1960), pp. 4613–4627.

Chemical Abstracts, vol. 55 (1961), Subject Index, p. 11176S.

IRVING MARCUS, *Primary Examiner.*

D. T. McCUTCHEN, NICHOLAS S. RIZZO, WALTER A. MODANCE, *Examiners.*